Jan. 5, 1937.                L. R. EVANS                2,066,560
                    VARIABLE SPEED DRIVE MECHANISM
                    Filed July 13, 1934        3 Sheets-Sheet 1
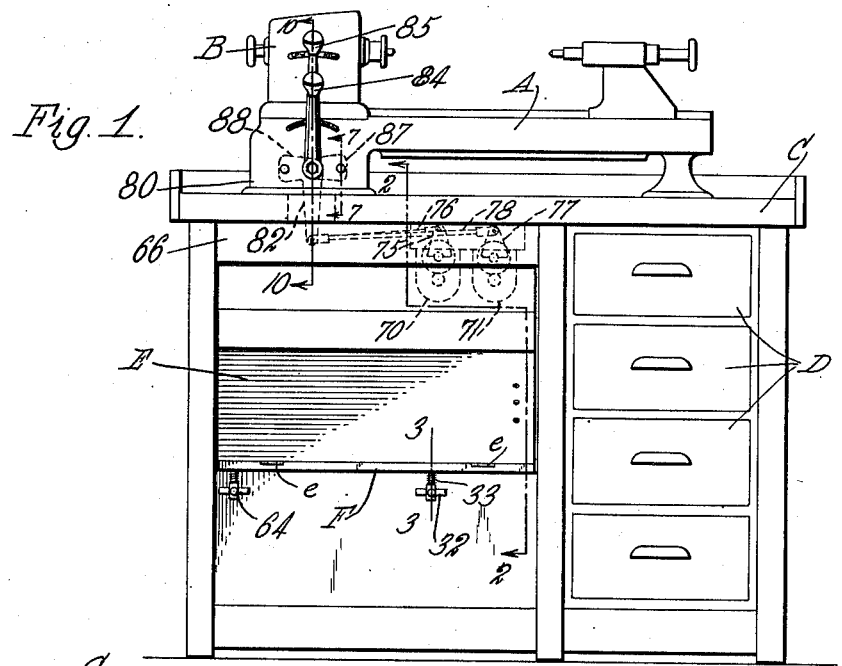
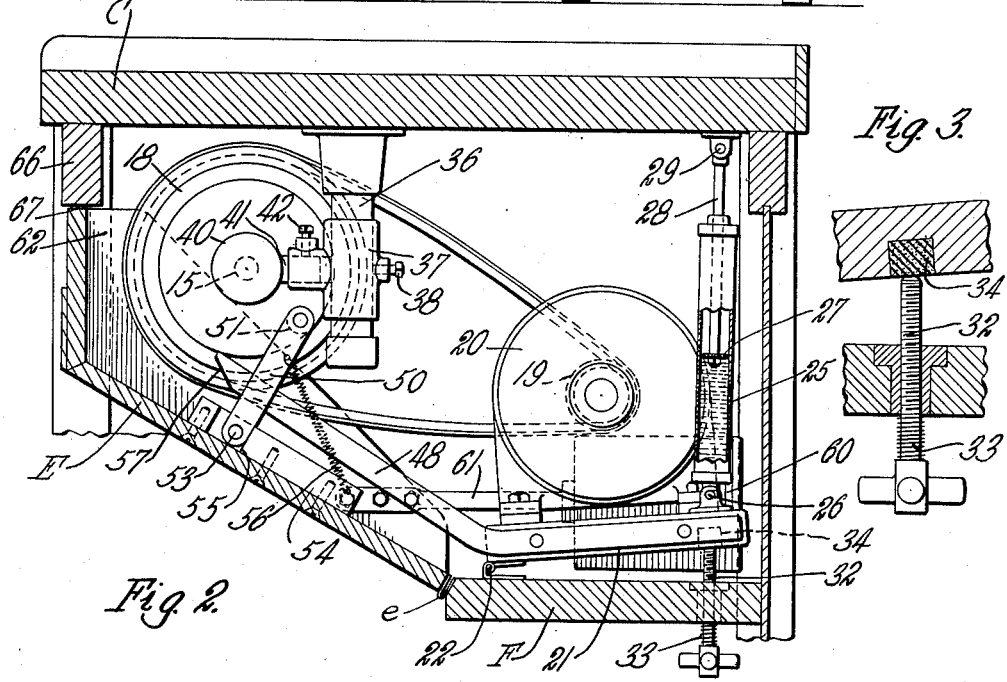
INVENTOR
Leigh R. Evans
by Parker, Prochnow & Harmer
ATTORNEYS

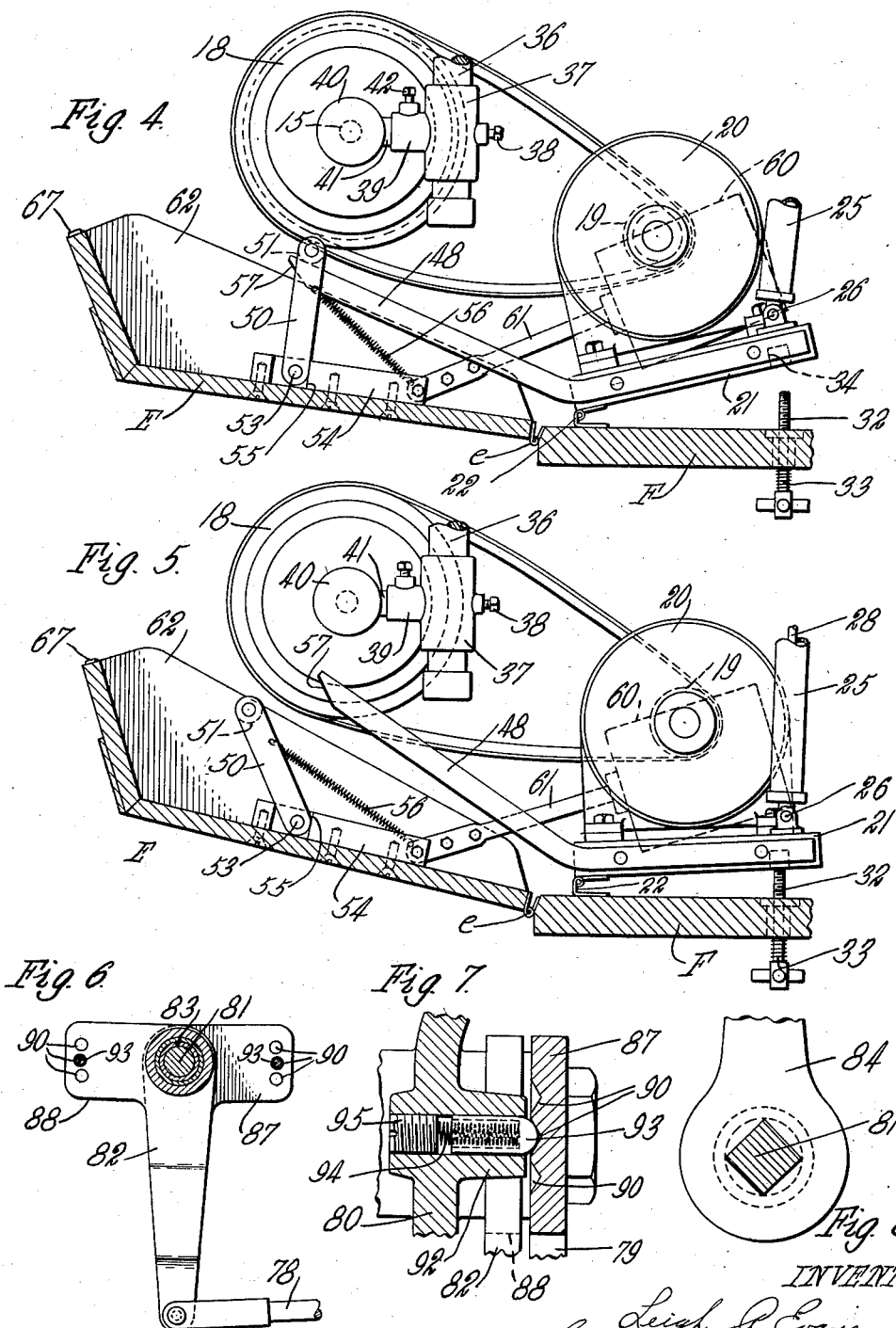

Jan. 5, 1937. L. R. EVANS 2,066,560
VARIABLE SPEED DRIVE MECHANISM
Filed July 13, 1934 3 Sheets-Sheet 3
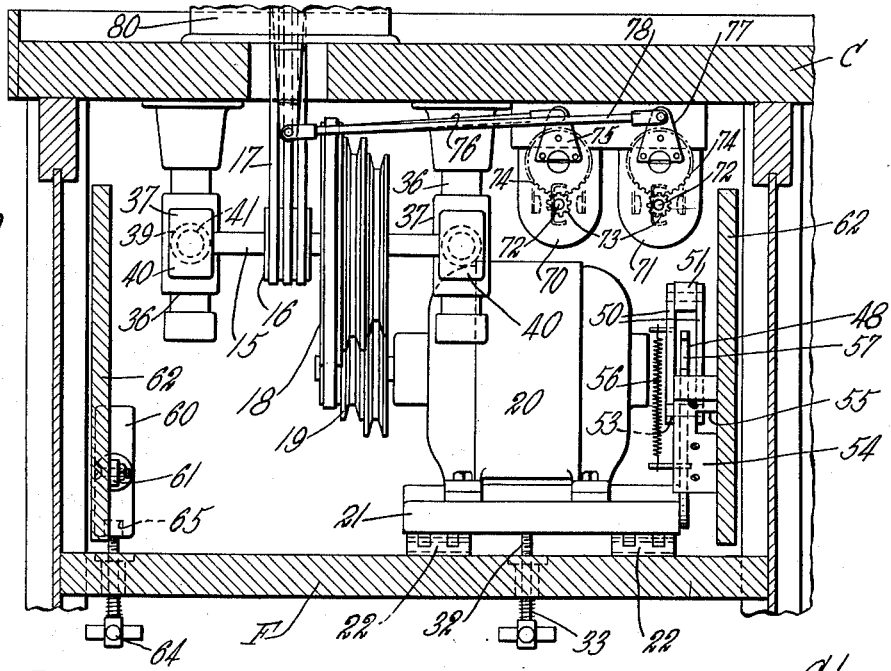
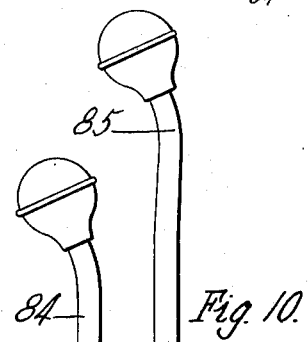
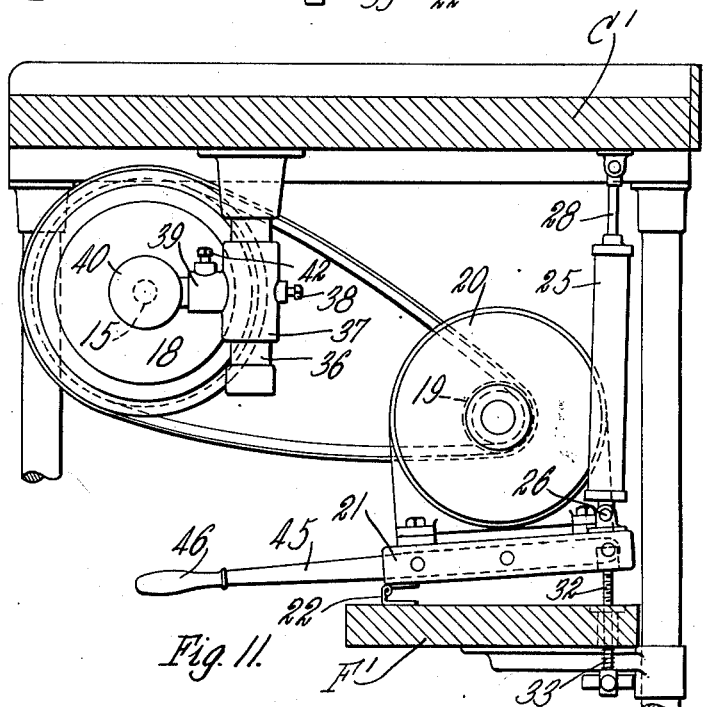

Patented Jan. 5, 1937

2,066,560

UNITED STATES PATENT OFFICE 2,066,560

VARIABLE SPEED DRIVE MECHANISM

Leigh R. Evans, Elmira, N. Y., assignor to Hardinge Bros. Inc., Elmira, N. Y.

Application July 13, 1934, Serial No. 735,011

15 Claims. (Cl. 74—242.15)

This invention relates to driving mechanisms for use in driving machines or apparatus at varying rates of speed. The invention is shown in the accompanying drawings as applied to driving a bench lathe, but it will be understood that the mechanism described may be used for driving machine tools of any other type, or other machines or apparatus.

The objects of this invention are to provide a variable speed driving mechanism of improved construction, by means of which a change in speed can be easily effected, and which is simple in construction and reliable in operation.

Another object of the invention is to provide an improved mounting for a motor or other source of power; also to provide an improved arrangement for supporting a motor to permit the same to be easily moved out of its operating position, and at the same time to resist movement of the motor out of its operating position due to sudden changes in torque or load; also to provide a motor mounting which is so arranged as to be shifted by opening of a closure member which partly encloses the driving mechanism.

Another object of the invention is to provide unimproved controlling mechanism for the motor which is of compact, simple and easily operated construction.

Further objects of the invention are set forth in the following description and claims.

In the accompanying drawings:

Fig. 1 is a front elevation of a machine tool mounted on a bench or support and provided with a variable speed driving mechanism embodying this invention.

Fig. 2 is a fragmentary transverse sectional elevation thereof, on line 2—2, Fig. 1, on an enlarged scale.

Fig. 3 is a fragmentary section thereof on line 3—3, Fig. 1, on a still larger scale, showing in elevation a portion of the driving mechanism.

Figs. 4 and 5 are elevations of the driving mechanism similar to that shown in Fig. 2, but showing the parts in different positions.

Fig. 6 is a fragmentary longitudinal elevation, partly in section, on line 6—6, Fig. 10.

Fig. 7 is a fragmentary vertical sectional view on an enlarged scale, on line 7—7, Fig. 1.

Fig. 8 is a section on line 8—8, Fig. 10.

Fig. 9 is a front elevation of the driving mechanism shown in Fig. 1 with the cabinet shown in section.

Fig. 10 is a sectional elevation, partly in section, on an enlarged scale on line 10—10, Fig. 1.

Fig. 11 is a side elevation of a driving mechanism of slightly modified construction.

The driving mechanism is illustrated in the accompanying drawings as used in connection with a bench lathe having a bed A and a head stock B and mounted on a horizontal supporting surface or plate C. In the particular construction shown in Fig. 1, the supporting plate C forms a part of a bench and the portion of this bench below the plate C is partly enclosed to form a cabinet having a series of drawers D or other compartments at one side thereof and having the driving mechanism for the lathe enclosed in a compartment of the bench which has a swinging closure E, hinged at e on a fixed plate or sub-base F. In the construction illustrated in Fig. 11, similar drive mechanism is mounted on a bench lathe in which the portion below the supporting plate C' is not enclosed as shown in Fig. 1, and in which a sub-base or support F' for a part of the drive mechanism is provided. The driving mechanism embodying this invention is, however, not limited in its application to the machine or apparatus driven thereby, nor to the particular support on which it is mounted, the bench or cabinet shown being merely illustrative of one use to which my improved mechanism may be applied.

The head stock B of the lathe or the corresponding part of any other machine or apparatus to be driven may be connected in any suitable or desired manner to a countershaft 15 suitably journalled beneath the supporting plate C. In the particular construction illustrated, this countershaft has a pulley 16 connected by one or more belts 17 with a corresponding pulley (not shown) on the part to be driven. The countershaft 15 is also provided with a cone pulley 18 driven by a belt from a driven cone pulley 19. This pulley 19 may be mounted directly on the shaft of the motor or other source of power 20, or may be otherwise mounted and driven from the motor. V belts are preferably used for transmitting the power although other driving means may be employed. When a V belt is to be shifted, because of the depths of the grooves in the pulleys in which the belt operates, a movement of the pulleys toward each other is generally necessary to provide sufficient slack in the belt to permit the same to be shifted and driving motors have heretofore been mounted on hinged or pivoted bases to permit movement of the motor toward the driven cone pulley 18. I employ a base 21 of this kind on which the motor 20 and the pulley 19 are mounted and movable in any suitable manner on the supporting plate F of the bench, so that the motor and pulley 19 may be moved toward the cone pulley 18, and preferably the base 21 is hinged at 22 on the support F, as illustrated in Fig. 4.

I preferably employ a variable speed motor operated through controllers as hereinafter described, and I have found that in adjusting the controllers for varying the speed of the motor or reversing its direction of rotation or when the load on the motor is suddenly changed, a motor, if mounted on a pivoted base, will during sudden changes of speed or load pull itself toward the cone pulley 18, thus causing the base 21 to swing suddenly about its hinge and later to drop back. When the driving mechanism is used in connection with a precision lathe or other machine tool, such violent movements on the part of the driving motor are objectionable and are apt to result in inaccuracies on the work on which the machine tool is operating. I have, consequently, provided dash pot or shock absorbing means acting on the motor or its base to prevent such sudden movement, but to permit the motor to be readily moved more slowly toward and from the cone pulley 18 for shifting the belt. Any suitable shock absorber or damper may be employed for this purpose, and in the construction shown, I provide a cylinder 25 pivoted at 26 on the base 21. A plunger or piston 27 is slidably arranged within the cylinder and connected to a rod 28 extending out of the cylinder and pivoted at 29 on a fixed part of the supporting frame of the machine. The cylinder is filled with a fluid and the piston or plunger either fits loosely within the cylinder or is provided with a small aperture or restricted by-pass through which the fluid must pass to permit relative movement between the piston and the cylinder. Consequently, if, due to a sudden change of load or speed, the motor 20 exerts such a pull on the belt 30 as to tend to cause the motor suddenly to swing upwardly, this upward movement will be resisted by the dash pot or shock absorber, which, however, will permit the motor to be swung more slowly about its pivot so that the belt can be shifted.

I have found that when a V belt is used for transmitting power from the motor shaft, superior results can be obtained by proper adjustment of the belt, and particularly by operating with the belt comparatively loose. In constructions heretofore used in which a pivoted motor base was employed, the weight of the motor was used to tension the belt. I have found, however, that with a V belt, it is better to provide a support for the motor which can be adjusted so that there is comparatively little tension on the belt, except that due to the torque of the motor. Any suitable or desired construction may be employed for adjusting the motor about its pivotal support so as to hold the same in the desired relation to the belt. In the construction shown for this purpose, I provide a set screw or adjusting screw 32 having a threaded engagement in a sleeve secured on the plate or sub-base F and the upper end of this set screw engages the motor base 21. Consequently, by adjusting the set screw, the base may be swung about its pivot or hinge 22. A spring 33 is preferably provided for holding the set screw in adjusted position, and I also prefer to employ a cushion or yielding member between the base and the set screw to prevent vibration and noise. In the construction shown, the motor base 21 is recessed and a cushion or bumper 34 of rubber or other yielding material is secured in the recess in position to be engaged by the end of the set screw 32.

By means of the construction described, a very superior driving action through the belt results. Due to the fact that driving belts cannot be made of absolutely uniform dimensions and flexibility throughout their lengths, a belt will tend to produce a certain amount of vibration, which is particularly noticeable at higher speeds and which is also objectionable when the belt is used in connection with the driving of precision tools, in which vibrations of the machine tool or of its supporting base may result in slight inaccuracies in the work which is being operated upon. V belts do not require the same amount of tension as flat driving belts, and consequently, if the set screw 32 is so adjusted that the belt 30 will be comparatively slack, the unevenness in the belt will cause a materially decreased amount of vibration of the machine. The resilient cushion or support 34 will further decrease the amount of vibration that will be transmitted to the frame of the machine. The dash pot or shock absorber 25 also reduces shocks which might be transmitted to the machine, and if during change of speed, the motor is raised out of contact with the supporting set screw 32 or other adjustable means, upon returning to its normal position, no shock will result, since the set screw will contact with the resilient cushion member. The construction described further produces an exceptionally quiet operation of the mechanism.

The cone pulley 18 and the pulley 16, together with their shaft 15 may be adjusted relatively to the pulley on the machine or apparatus which is being driven and relatively to the motor 20 in any suitable manner. In the construction shown, a pair of cylindrical supporting rods or tubes 36 are suitably mounted to extend downwardly from the supporting plate C and sleeves 37 are adjustably arranged on the rods 36, set screws 38 being provided to support these sleeves at the desired elevation. Each of the sleeves 37 has a tubular projection or socket 39 extending laterally therefrom and the bearings 40 for the shaft 15 are secured on rods 41 slidable in the sockets 39, set screws 42 being provided to secure these rods in adjusted positions. By adjusting the sleeves 37 lengthwise of their rods 36, the desired tension of the belts 17 may be attained, and by moving the rods 41 into and out of the sockets 39, adjustment of the shaft 15 toward and from the motor may be effected. This latter adjustment may be supplemented to a certain extent by the adjustment of the motor base about its hinge or pivot 22 by means of the set screw 32.

The motor base may be swung about its pivotal support in any suitable or desired manner for shifting the belt or for other purposes. For example, the motor base may be provided with an extension or lever 45 as shown in Fig. 11 having a handle portion 46 and extending toward the front of the bench or support. When it is desired to shift the belt, the operator merely moves the handle 46 downwardly, thus swinging the motor about the pivot or hinge 22 to provide the necessary slack in the belt. In the cabinet type of bench shown in the other figures, means are preferably provided for moving the motor and pulley 19 toward the pulley 18, when the closure member E is swung into open position. For this purpose, in the construction illustrated in the other figures, a lever or arm 48 is secured to the base and extends upwardly and forwardly, and a detachable connection of any suitable kind may be provided between the closure member E and the arm 48. In the particular construction shown for this purpose, a pair of parallel links 50 are provided which are arranged to extend at opposite sides of the arm 48 and are connected by a cross member or roller 51, see Fig. 9. The links are of such length that after a certain amount of initial opening movement of the closure member E, the cross member or roller 51 will engage the upper edge of the arm 48, and upon further downward movement of the closure member E, the arm 48 will be swung with the closure member, thus swinging the motor base 21 about its hinged connection 22 as shown in Fig. 4.

The connecting member between the closure member and the arm 48 of the motor base is preferably made so as to be disconnected, so that the closure member E may be swung into open position without changing the position of the motor base. For this purpose, the links 50 of this member are preferably pivoted at their lower ends at 53 upon a suitable supporting bracket 54 which is also provided with a stop or shoulder 55. A spring 56 connects a link 50 with the base 54 and thus normally pulls the links into a position in which they engage the stop shoulder 55, in which position, the connecting member will engage the arm 48 of the motor base. If, however, it is desired to swing the closure member E into open position without moving the motor base, the operator upon initial opening of the closure member E can reach the connecting member and pull the same forwardly out of engagement with the arm 48, so that the closure member can be further opened without moving the motor base. Upon releasing the connecting member, the spring 56 again pulls the same into a position in which the links engage the shoulder 55, and consequently, when the closure member is returned into a closing position, the outer end of the connecting member will engage the undersurface of the arm 48, particularly the beveled portion 57 thereof and will be moved about its pivot against the action of the spring 56 so as to pass over the end of the arm 48, whereupon the spring will again return the connecting member to its normal position in which the cross piece or roller 51 thereof is arranged above the arm 48. Any other means for actuating the motor base to move the motor into a position to permit the belt to be shifted may be employed.

The closure member E is preferably counterbalanced so as to be normally held in closed position. In the construction shown for this purpose, a counterbalance weight 60 is provided which is connected by means of an arm 61 to a part of the closure member, for example, to a side flange 62 thereof. When the closure member is in closed position, the counterweight will be in a position above the plate or sub-base F, and in order to hold the closure member approximately in closed position, the sub-base F is preferably provided with a second set screw 64 substantially similar to the set screw 32. The upper end of the set screw 64 engages a bumper or cushion member 65 which is suitably secured to the counterweight 60, for example, by securing the cushion member in a hole or recess in the counterweight. This cushion prevents shock or vibration when the closure member moves into closing position and the set screw 64 is preferably set in such position that the upper edge of the closure member E will be held just out of contact with the depending ledge or cross member 66 of the bench, so that no vibration or rattling of the upper edge of the closure member E against the ledge 66 will result. In order to further insure against jars during the closing of the closure member, resilient pads or cushions 67 may be secured to the upper edge of the closure member which may contact with the ledge 66, in the event of a rapid closing movement of the closure member which would result in a material compression of the cushion 65. The counterweight 60 and its supporting arm 61 are so arranged relatively to the closure member E, that when the closure member is swung into a wide open position, the counterweight will move forwardly of a vertical plane through the hinge e, or beyond its dead center position. When in this position, the counterweight will tend to hold the closure member in open position, and thus facilitate any work that may be necessary within the portion of the cabinet enclosed by the closure member.

It will be noted that the dash pot means also act, through the medium of the connection between the base and the closure member, to prevent damage either to the closure member or to the motor, which might result from rapid opening of the closure member. Similarly the dash pot means prevent sudden changes in speed or load from shifting the motor sufficiently to cause the same to open the closure member through the medium of the arm 48. At the same time, it will be noted that because of the connection between the arm 48 and the connecting member of the closure member, the operative position of the motor relatively to the driven pulley may be varied by the stop or set screw 32 without effecting the proper closing of the closure member.

In order to obtain a wide range of speeds in both directions of rotation of the machine tool or driven member, the motor 20 preferably is of the reversible multi-speed type, suitably connected with controllers 70 and 71. The controller 70, for example, may operate to reverse the direction of rotation of the motor while the controller 71 provides for operation of the motor at two or more different speeds. Each of these controllers is provided with a central shaft 72 on which the movable contacts are mounted, and which is usually rotatable by means of a handle on the shaft. In my improved construction, these controllers are mounted beneath the top or supporting surface C of the bench, and in order to make these controllers operable from above this surface, I preferably provide a pinion 73 on each of these controllers which meshes with a gear 74, so that a relatively small turning movement of the gear results in a relatively large movement of rotation of the pinion. The gear 74 of the controller 70 is provided with an extension or crank portion 75 to which one end of a connecting or actuating rod 76 is pivoted, and the other controller is provided with a similar extension or crank 77 having a rod 78 pivoted thereto. These connecting rods or links may be connected with any suitable actuating means preferably extending through the supporting plate into a position to be easily accessible to the operator of the machine or apparatus. Any suitable construction may be used for this purpose. In the particular construction illustrated by way of example, the other end of the rod 76 is connected to the lower end of an arm 79 which extends upwardly into the interior of a leg 80 of the lathe or machine tool and the upper end of the arm 79 is suitably secured to a shaft 81 rotatably arranged on the lathe or other apparatus and extending outwardly to the front face thereof. The other connecting rod 78 is connected to another similar arm 82, the upper end of which is secured to a sleeve or tubular part 83 arranged about the shaft 81. Two operating handles 84 and 85 are provided, the handle 84 being connected to the front end of the shaft 81 so as to actuate this shaft and the arm 79 connected therewith, as well as the connecting rod 76 leading to the controller 70 for controlling the direction of rotation of the motor in such a manner that if the arm 84 is moved in one direction, the motor will operate in a forward direction, while when moved in the opposite direction from its upright position, the motor will be operated in reverse. When in upright or vertical position, the supply of current to the motor will be shut off. The other arm 85 is secured to the sleeve 83, and consequently, controls the movement of the arm 82 and the connecting rod 78 connected therewith and to the controller 71 for varying the speed of rotation of the motor.

Any suitable or desired means may be employed for supporting the controllers or their actuating mechanisms in their various positions, and in the construction shown for this purpose, the arm 79 is provided with an off-set portion or extension 87, while the other arm 82 is provided with a corresponding extension 88 projecting in the opposite direction, see particularly Figs. 1, 6, and 7. These extensions or laterally projecting parts of the arms are provided with detent means for yieldingly holding the arms of which they form a part in their various operative positions. Any suitable or desired detent means may be provided. Those shown in the construction illustrated include a series of shallow depressions 90 formed in one face of each of these arms. The frame or body portion of the lathe or other machine adjacent to these extensions of the arms 79 and 82 is provided with apertured lugs 92 having plungers 93 slidably arranged therein and pressed toward the extensions 87 and 88 by means of springs 94 arranged in the apertured lugs and held in position therein by screws or plugs 95 having a threaded engagement in the outer ends of the apertured lugs. These spring pressed plungers will enter into one or another of the depressions 90 in the extensions 87 and 88, thus yieldingly holding the controller arms 79 and 82 in their various positions. The construction described has the advantage that the extensions 87 and 88 of the arms 79 and 82 can be made of suitable material of sufficient hardness so that the plungers 93 in moving across the surfaces of the extensions from one depression to another will not readily wear or cut grooves into the extensions.

In the operation of the driving mechanism described, the operator can readily shift the levers 84 and 85 to set the controllers into any desired position. If further variations in speed are necessary, the operator can open the closure E, or depress the lever handle 46, Fig. 11, whereupon the motor will be in a position in which the belt can easily be shifted, and the return of closure member E or release of the handle 46 will automatically return the motor to its driving position. The motor mounting including the dash pot means is particularly adapted for use with variable speed motors and enables the operator to quickly shift the controller handles without producing a jumping or swinging of the motor with its base, with its resulting shocks or jars to the driven device.

The variable speed drive mechanism shown has the advantage that practically all the parts thereof with the exception of the controller arms 84 and 85 are so located as to be concealed or covered so as to be protected against damage by accidental contact with other parts and from chips, cuttings, lubricant, or other material which may drop from the lathe or other machine driven by my improved mechanism. The controller handles 84 and 85 are located where they are very convenient for the operative to actuate and where they are not in the way or apt to be moved inadvertently into a different position. All movable parts of the speed changing mechanism are held against vibration, jar or shock, so that my improved variable speed driving mechanism may be used to good advantage with machines capable of operating with a high degree of accuracy.

I claim as my invention:

1. A variable speed driving mechanism including a motor, a pulley driven by the motor, a belt connecting said pulley with a driven member, supporting means for permitting the motor to move toward and from the driven member to permit shifting of said belt, said motor being yieldingly held in its operative relation to the driven member, and dash pot means for preventing rapid movement but permitting gradual movement of the motor toward said driven member.

2. A variable speed driving mechanism including a motor, a pulley driven by the motor, a belt connecting said pulley with a driven member, supporting means for permitting the motor to move toward and from the driven member to permit shifting of said belt, said motor being yieldingly held in its operative relation to the driven member, adjustable stop means for limiting the movement of the motor away from the driven member, and means for preventing rapid movement and permitting gradual movement of the motor toward the driven member.

3. The combination of a driven pulley, a driving pulley, a motor for driving said driving pulley, a belt connecting said pulleys, a support for permitting said motor and pulley to move toward and from said driven pulley, stop means for limiting the extent to which said motor may move away from said driven pulley, and which determine the normal operative position of the motor, and a resilient cushion interposed between said motor and said stop means to prevent shock when said motor moves into its operative position.

4. The combination of a driven pulley, a driving pulley, a motor for driving said driving pulley, a belt of V-shaped cross section connecting said pulleys, a pivoted support for the motor permitting said motor to move toward said driven pulley for shifting said belt and from said driven pulley into a driving position, and arranged to cause the weight of the motor to move said support and motor about the pivotal axis of said support away from said driven pulley, and adjustable stop means for limiting the extent to which the motor may move away from said driven pulley to hold said motor in a position in which said belt is loose while transmitting power.

5. The combination of a driven pulley, a driving pulley, a motor for driving said driving pulley, a belt of V-shaped cross section connecting said pulleys, a pivoted support for the motor permitting said motor to move toward said driven pulley for shifting said belt and from said driven pulley into a driving position, and arranged to cause the weight of the motor to move the same about its axis away from said driven pulley, adjustable stop means for limiting the extent to which the motor may move away from said driven pulley to limit the extent to which the weight of said motor applies tension to said belt when the motor is in driving position, and resilient means interposed between said motor and said stop means to prevent shock when said motor moves into engagement with said stop means.

6. The combination of a driven pulley, a driving pulley, a motor for driving said driving pulley, a belt connecting said pulleys, a pivoted support for the motor permitting said motor to move toward and from said driven pulley, and arranged to cause the weight of the motor to move the same about said pivotal support away from said driven pulley, and a dash pot device for retarding rapid movement and permitting slow movement of said motor about its pivotal support toward said driven pulley.

7. The combination of a driven pulley, a driving pulley, a motor for driving said driving pulley, a belt connecting said pulleys, a movable support for guiding said motor and driving pulley toward and from said driven pulley, a movable closure member partly enclosing said pulleys and motor when in closed position and adapted to move into open position to afford access to said pulleys and motor, and a connection between said closure member and said movable support for moving said motor and driving pulley toward said driven pulley when said closure member is moved into open position.

8. The combination of a pair of pulleys connected by a belt, a motor for driving one of said pulleys, a movable support for one of said pulleys to permit the same to move toward and from the other pulley to permit shifting of said belt, a closure member partly enclosing said pulleys when in closed position and movable into open position to render said pulleys accessible, and connecting means between said closure member and said movable support for moving one of said pulleys toward the other when said closure member is moved into open position.

9. The combination of a driven pulley, a driving pulley, a motor for driving said driving pulley, a pivotal support for said motor and driving pulley arranged to cause the weight of the motor to move said driving pulley in a direction away from said driven pulley for tensioning the belt, a closure member partly surrounding said pulleys and motor when in closed position and movable into open position to render said pulleys and motor accessible, means connecting said motor support and said closure member to cause said closure member when swinging into its open position to move said support about its pivot to cause said driving pulley to move toward said driven pulley.

10. The combination of a driven pulley, a driving pulley, a motor for driving said driving pulley, a pivotal support for said motor and driving pulley arranged to cause the weight of the motor to move said driving pulley in a direction away from said driven pulley for tensioning the belt, a closure member partly surrounding said pulleys and motor when in closed position and movable into open position to render said pulleys and motor accessible, an arm extending from said motor support to said closure member, and a part on said closure member adapted to engage said arm to move said motor support about its pivot when said closure member is moved into open position, to cause said driving pulley to be moved toward said driven pulley.

11. The combination of a driven pulley, a driving pulley, a motor for driving said driving pulley, a pivotal support for said motor and driving pulley arranged to cause the weight of the motor to move said driving pulley in a direction away from said driven pulley for tensioning the belt, a closure member partly surrounding said pulleys and motor when in closed position and movable into open position to render said pulleys and motor accessible, an arm extending from said motor support to said closure member, a part on said closure member yieldingly held in position to engage said arm to cause said closure member when moving into open position to cause said arm to swing said motor and driving pulley toward said driven pulley, said movable part being movable into an inoperative position to avoid engagement of said movable part with said arm.

12. The combination of a driven pulley, a driving pulley, a motor for driving said driving pulley, a belt connecting said pulleys, a movable support for guiding said motor and driving pulley toward and from said driven pulley, a movable closure member partly enclosing said pulleys and motor when in closed position and adapted to move into open position to afford access to said pulleys and motor, a connection between said closure member and said movable support for moving said motor and driving pulley toward said driven pulley when said closure member is moved into open position, and dash pot means for retarding the opening movement of said closure member and the movement of said movable support toward said driven pulley.

13. The combination of a driven pulley, a driving pulley, a motor for driving said driving pulley, a belt connecting said pulleys, a movable support for guiding said motor and driving pulley toward and from said driven pulley, a movable closure member partly enclosing said pulleys and motor when in closed position and adapted to move into open position to afford access to said pulleys and motor, a connection between said closure member and said movable support for moving said motor and driving pulley toward said driven pulley when said closure member is moved into open position, dash pot means for retarding the opening movement of said closure member and the movement of said movable support toward said driven pulley, and stop means, adjustable independently of said closure member to limit the extent to which said movable support may move from said driven pulley.

14. The combination of a driven pulley, a driving pulley, a motor for driving said driving pulley, a belt connecting said pulleys, a movable support for guiding said motor and driving pulley toward and from said driven pulley, a movable closure member partly enclosing said pulleys and motor when in closed position and adapted to move into open position to afford access to said pulleys and motor, a connection between said closure member and said movable support for moving said motor and driving pulley toward said driven pulley when said closure member is moved into open position, and dash pot means acting on said movable support for limiting the rate of movement of said support toward said driven pulley, and for limiting the rate of movement of said closure member into open position through the medium of said connection between said closure member and movable support.

15. The combination of a driven pulley, a driving pulley, a motor for rotating said driving pulley, a belt of V-shaped cross section connecting said pulleys, a support on which said motor is secured and which is mounted to permit said motor to move toward and from said driven pulley, the weight of the motor moving said support from said driven pulley, and stop means for limiting the extent to which said motor may move away from said driven pulley, and which determine the normal operative position of said motor and which hold said motor and driving pulley in such relation to said driven pulley as to cause the belt to be loose while transmitting power and to prevent the weight of the motor from applying tension to said belt beyond the extent permitted by said stop means.

LEIGH R. EVANS.